(12) United States Patent
Tsuda (10) Patent No.: US 6,233,094 B1
(45) Date of Patent: *May 15, 2001

(54) TELESCOPE UTILIZING GLOBAL POSITIONING SYSTEM (GPS)

(75) Inventor: Koji Tsuda, Saitama-Ken (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,568

(22) Filed: Jan. 16, 1998

(30) Foreign Application Priority Data

Jan. 17, 1997 (JP) .................................................. 9-019933

(51) Int. Cl.[7] .................................................. G02B 23/00

(52) U.S. Cl. .......................... 359/400; 259/407; 259/172

(58) Field of Search .................................... 359/159, 172, 359/399, 400, 407, 408, 409, 410, 411, 412, 418, 480; 250/203.1

(56) References Cited

U.S. PATENT DOCUMENTS

| 4,949,089 | * | 8/1990 | Ruszkowski, Jr. ...................... 342/52 |
| 5,579,165 | | 11/1996 | Michel et al. ........................ 359/630 |
| 5,801,866 | * | 9/1998 | Chan et al. ........................... 359/172 |
| 5,815,411 | * | 9/1998 | Ellenby et al. ....................... 364/559 |
| 5,825,480 | * | 10/1998 | Udagawa ............................. 356/138 |

FOREIGN PATENT DOCUMENTS 5224290   9/1993   (JP) .

* cited by examiner

Primary Examiner—Cassandra Spyrou
Assistant Examiner—Mark A. Robinson
(74) Attorney, Agent, or Firm—Greenblum & Bernstein, P.L.C.

(57) ABSTRACT

A telescope includes a position determining system for receiving positioning signals from GPS satellites to obtain the present position of the binocular. A relative-position calculation system provides for calculating a distance, an altitude difference, and an azimuth angle between the telescope and an external device based on the present position of the telescope and the position information of the external device. The telescope further includes an indication system which indicates, by a displaying device, the values of the distance, altitude difference and azimuth angle.

20 Claims, 5 Drawing Sheets

TELESCOPE UTILIZING GLOBAL POSITIONING SYSTEM (GPS)

BACKGROUND OF THE INVENTION

The present invention relates to a telescope utilizing a Global Positioning System (GPS).

Conventionally, telescopes have been used as instruments for observing remote objects. A telescope expands a visual angle of a remote object and enables a user to observe the object in a field of view. In this specification, the term telescope refers to an any optical instrument that meets the above definition. Thus, the telescope includes not only a monoscope but a binocular, periscope and the like.

Conventionally, a telescope, for example a binocular, is used for facilitating observation of a remote object. If, however, a user of the binocular (telescope) intends to observe an object remote from the binocular (telescope) and position and/or direction thereof is not known, the user must search in all directions carefully.

If, for example, a member of a certain group such as a hunting or mountaineering group accidentally left the group, and it becomes necessary to find the member with the binocular, it is often difficult to bring the member within the field of view of the binocular as far as the position of the member relative to the group is not known. In such a case, it may likely be difficult for the member to accurately specify the position where the member is. Moreover, even though the lost member can communicate with another member in the group by means of a radiotelephone apparatus or the like, if the communicating members do not know their respective accurate positions and tell the respective positions accurately to each other, it is difficult for them to know their relative position, so that it is extremely difficult to recognize the lost member from a remote position of the binocular.

SUMMARY OF THE INVENTION

It is therefore an object of the invention to provide an improved telescope that enables each of users of the telescope who cannot specify their respective positions to bring the other into the fields of view.

Another object of the present invention is to provide a telescope that enables each of the users of the telescope capable of viewing each other to accurately know their relative positions, or their positional relationship.

A further object of the present invention is to provide a telescope that enables the user of the telescope to know the accurate position thereof.

According to the invention, there is provided a telescope for expanding a visual angle of a remote object and allowing observation of an object image in a field of view the telescope, comprising: a position determining system which receives a position signal from GPS satellites to calculate a present position of the binocular; a communication system which communicates with an external device which is capable of transmitting information regarding a position of the external device; a relative position determining system which determines a relative position of the external device with respect to the telescope based on the present position obtained by the position determining system and position information received by the external device; and an indication system which indicates information regarding the relative position of the external device relative to the telescope.

In the above telescope, the relative position determining system may obtain, by calculation, a distance, an altitude difference, and an azimuth angle between the telescope and the external device.

Optionally, the relative position determining system may obtain the relative position based on the present position and the position information which have been obtained at the same point of time.

In the telescope above, the indication system may be provided with a displaying device which visually indicates the relative position to a user of the telescope.

In this case, the displaying device displays the relative position in an observation field of view of the telescope.

It should be noted that the telescope includes a binocular.

Optionally, the telescope includes a data transmission system for transmitting the present position obtained by the position determining system, to the external device.

Further optionally, the indication system indicates the present position obtained by the position determining system, in addition to the relative position between the telescope and the external device.

In this case, the indication system comprises a display device which visually indicates the present position.

Still optionally, the indication system further indicates position information of the external equipment received from the external equipment.

Further optionally, the display device displays the present position in an observation view field of the telescope.

DETAILED DESCRIPTION OF THE PREFERRED EMBODIMENTS

Embodiments of the invention will be described with reference to the accompanying drawings.

Figure 1:
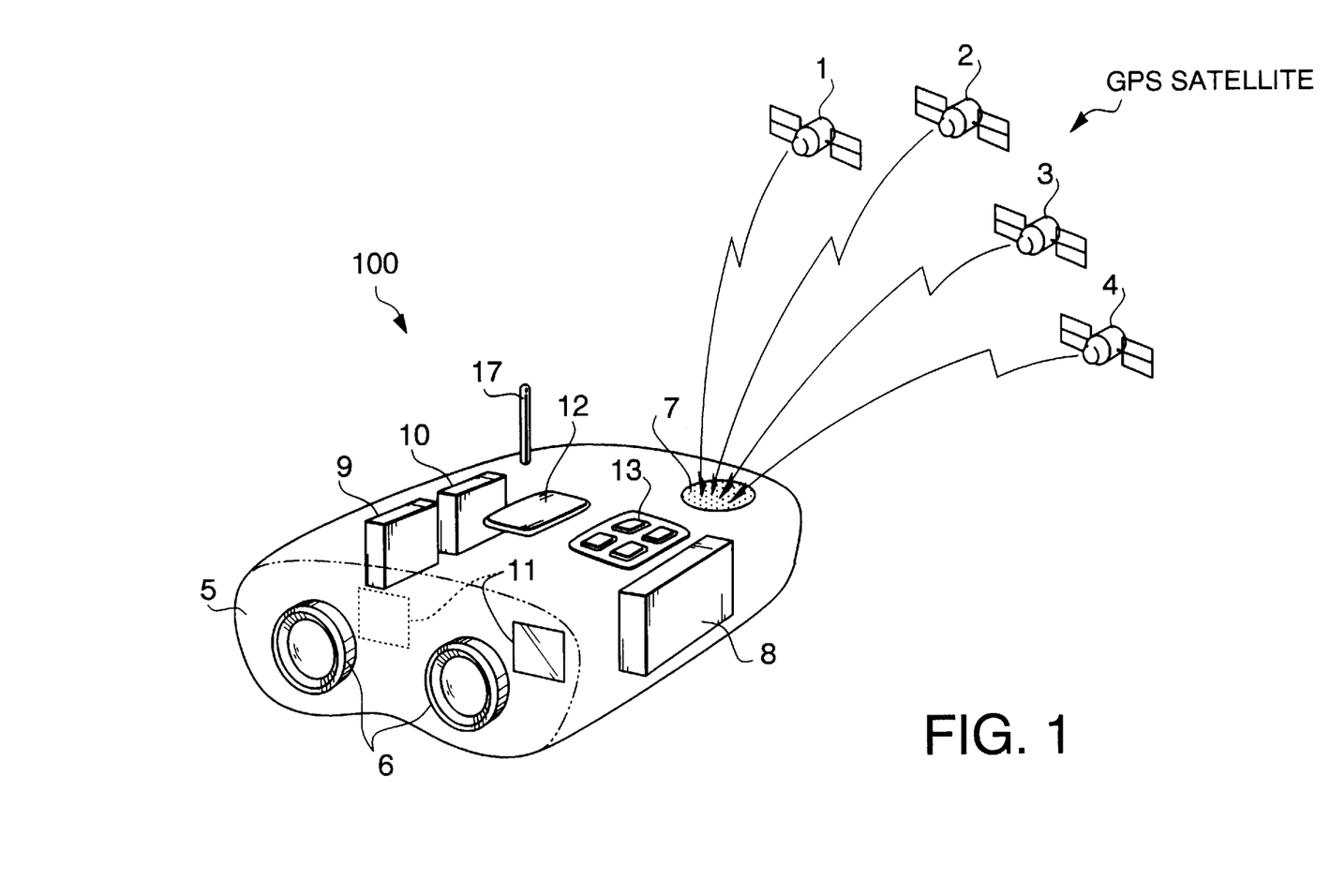
FIG. 1 shows a layout of units included in a binocular according to a first embodiment of the invention.
Figure 2:
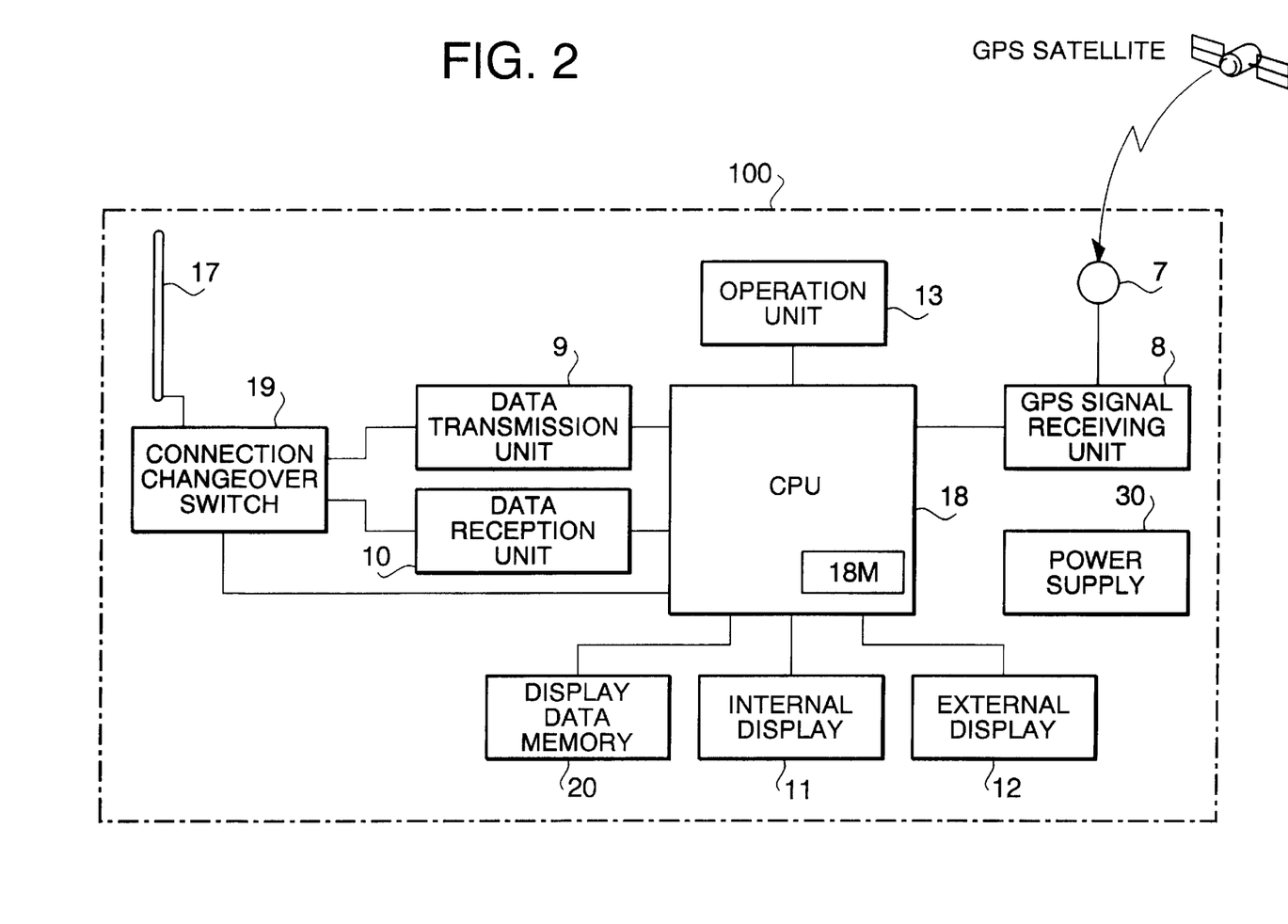
FIG. 2 is a block diagram showing a control system of the binocular shown in FIG. 1.

FIGS. 1 and 2 show a binocular 100 according to an embodiment of the present invention. FIG. 1 shows a layout of various units provided therein, while FIG. 2 is a block diagram of a control system of the binocular 100.

The binocular 100 comprises a main body 5 provided with eye-pieces 6. Inside the main body 5, an GPS antenna 7 and a GPS signal receiving unit 8 constitute a position determining system to receive a positioning signal from GPS satellites and to determine a present position by executing a position determining operations. The GPS antenna 7 is circular shaped, and receives radio waves for positioning (position determination) from usually four GPS satellites at the same time. The GPS signal receiving unit 8 has a function to determine the present position of a binocular and to obtain the time corresponding to the present position based on the signals received from the GPS antenna 7, in accordance with a so-called single-point observation method, which is generally known as a positioning method utilizing the GPS signals.

The single-point observation method is a method as follows: First, based on a difference between a time information sent by each GPS satellite and a time of the internal clock built in the GPS signal receiving unit 8, i.e. a time difference of emission and arrival of a radio wave by the GPS satellite and the GPS signal receiving unit 8, a distance between the GPS antenna 7 and each of the GPS satellites 1 through 4 is calculated Then, based on the four distance values between the antenna 7 and the four GPS satellites at the same point of time, information of three-dimensional position of the antenna 7 at a certain time is obtained.

According to the present embodiment, the position is calculated by receiving GPS signals from four GPS satellites. When the GPS signals received from four GPS satellites are used for obtaining the position information, four kinds of information, i.e., altitude, longitude, latitude, and time can be obtained. It may be possible to use only the signals transmitted by three GPS satellites. By using signals received from three satellites, three kinds of information is obtainable, i.e., longitude, latitude, and time can be obtained. For example, on the sea, the altitude can be considered to be approximately zero. In such a case, it is not necessary to obtain the altitude information, and therefore, by using GPS signals transmitted by only three satellites, necessary information, i.e., the longitude, latitude and time information, can be obtained.

The main body 5 houses a communication system which transmits and/or receives information to/from an external device having, for example, the similar position determining function as a binocular 100. With the communication system, information related to a position of the binocular 100 or the external device can be exchanged. The communication system has inside the main body 5: a transceiver which includes a data transmitting unit 9 to transmit the position information of the binocular 100 to the external device (e.g., a binocular of the other user) and a data receiving unit 10 to receive the position information from the external device, e.g., the binocular of the other user; a rod antenna 17; and a connection changeover switch 19 which selectively connects one of the data transmitting unit 9 or the data receiving unit 10 to the rod antenna 17. The above-mentioned GPS signal receiving unit 8, the data transmitting unit 9, the data receiving unit 10, and the connection changeover switch 19 are controlled by the CPU (Central Processing Unit) 18.

The main body 5 also houses a relative-position calculation system which obtains by calculation a relative position between the binocular 100 and the external device (e.g., the binocular of the other user) based on the present position of the binocular 100 obtained by the GPS signal receiving unit 8 and position information of the external device received via the communication system (i.e., the data transmitting unit 9, the data receiving unit 10, the rod antenna 17, and the connection changeover switch 19).

Moreover, as an indication system to indicate the position information such as a relative position with respect to the external device obtained by the above-mentioned relative-position calculation system, an internal display unit 11 is provided in the main body 5 and an external display unit 12 is provide on the outer surface of the main body 5.

When the user observes a remote target, i.e., the external device, with the binocular 100, the internal display unit 11 displays, within an observation view field, the following information:

the position information (latitude, longitude, and altitude of the binocular 100) and time obtained by the GPS signal receiving unit 8;

the position information (latitude,. longitude, and altitude) of the external device (e.g., the binocular of the other user) transmitted therefrom; and a relative position information regarding positional relationship between the binocular 100 and the external device (e.g., the binocular of the other user), the relative position information including a distance, altitude difference, azimuth angle of the external device relative to the binocular 100.

It should be noted that, although the present embodiment employs an azimuth value indicative of an angle measured relative to the true north as one of the displayed information of the relative position, it is also possible to calculate an angle relative to the magnetic north based on the azimuth angle and the other position information. Accordingly, it is also possible to display the angle relative to the magnetic north instead of the azimuth angle.

Specifically, the internal display unit 11 is constructed such that an LCD (Liquid Crystal Display) employing transparent electrodes is placed on the image plane. Thus, the user of the binocular 100 can view the displayed information as overlapped on the image of an observation target within the field of the eyepiece 6. The structure of the internal display unit 11 is not limited to the above-mentioned embodiment, but another structure can be employed. For example, characters formed with LEDs or the like may be formed as an image on the image plane by means of an optical system. The external display unit 12 may be an LCD (Lquid Crystal Display) or an LED (Light Emitting Diode) display.

In the present embodiment, the external display unit 12 and the internal display unit 11 display the similar information. Such information is first stored in a display data memory 20 and then is displayed, under control of the CPU 18, on both internal display unit 11 and the external display unit 12.

According to embodiment, the binocular 100 is provided both the internal display unit 11 and the external display unit 12. However, the binocular 100 may comprise only one of those units. The binocular 100 may also indicate the information by sound, or a combination of sound and display.

The operation unit 13 is provided with a plurality of switches:

a switch for turning ON/OFF of power which is supplied from a power-supply unit 30 built in the binocular 100 to various electrical components;

a switch for executing reception of signals from GPS satellites;

a switch for executing transmission of data to the external device; and a switch for executing reception of data from the external device.

The operation unit 13 is further provided with a communication mode setting switch, and a communication request switch.

The connection changeover switch 19 is switched by the CPU 18 when the communication request switch or the communication mode setting switch is operated. By operating the communication mode setting switch, operation mode of the binocular 100 is changed between a communication mode in which position information is obtained and displayed and a normal mode in which the above described function related to the position information is not used (i.e., the telescope functions only used). It should be noted that, in FIG. 2, to prevent the illustration from becoming complicated, connections between the power supply unit 30 and the other units are omitted, but the power-supply unit 30 supplies power to the electrical units such as the CPU 18.

Figure 3:
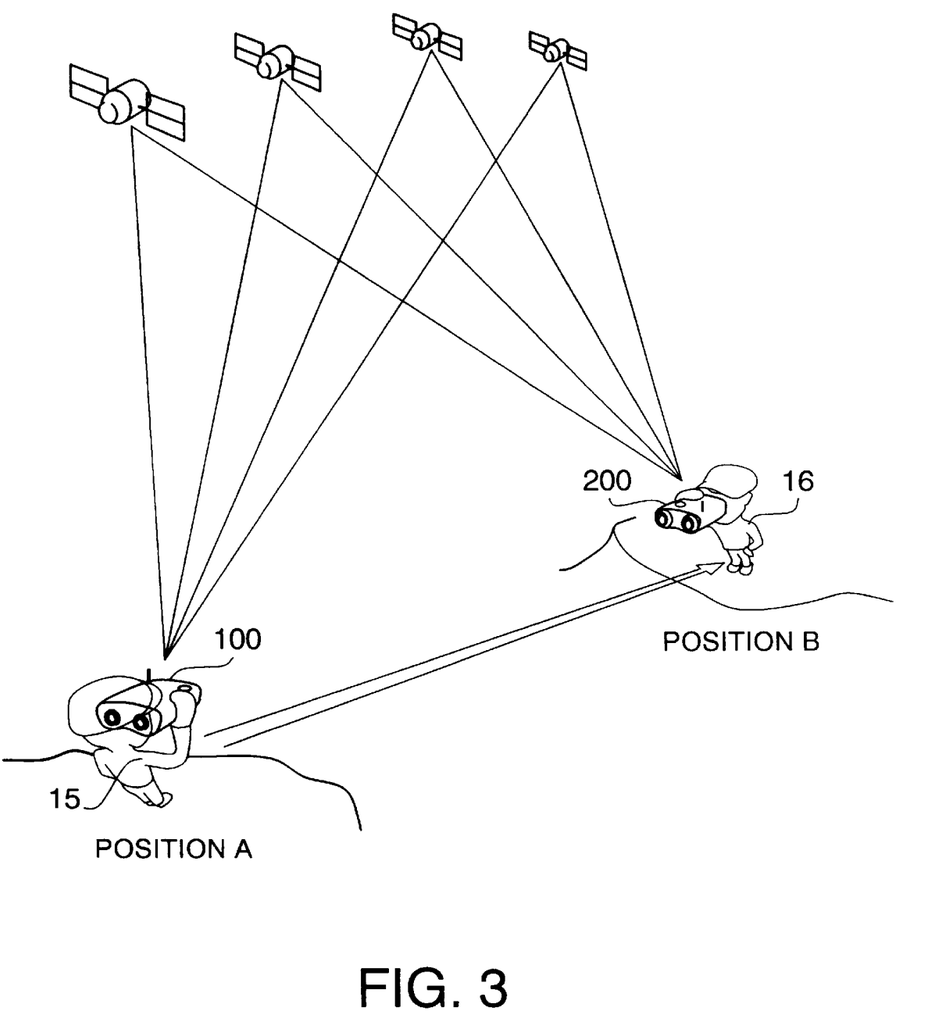
FIG. 3 shows a communication method using two binoculars.

FIG. 3 shows an exemplary case where two users 15 and 16 are located at spots A and B and have binoculars 100 and 200, respectively. The binoculars 100 and 200 both have position determining function as described above. The users 15 searches for the user 16 whose position is not known.

It is assumed that the binocular 100 operates in the communication mode. As shown in FIG. 1, the binocular 100 receives signals transmitted from GPS satellites 1 through 4, with the GPS antenna 7. Thus received signals are transmitted into the GPS signal receiving unit 8. The GPS signal receiving unit 8 then calculates a distance between the GPS antenna 7 and each of the GPS satellites 1 through 4, and based on the obtained distance values, three-dimensional position information (e.g., coordinates x, y and z in an x-y-z rectangular coordinates system) of the position A and the corresponding time are obtained. In the present embodiment, the position information (x, y, z) obtained by the GPS signal receiving unit 8 is the data in a three-dimensional rectangular coordinates system relative to the center of the earth as the origin.

The information (position information and time for the position A) are input in the CPU 18, and in the internal memory 18M (see FIG. 2), the position information is stored together with the corresponding time at, for example, every one second. The memory 18M can store a plurality of (e.g., several tens of) positioning data. If the memory 18M becomes full, the older data will be deleted sequentially to store new data.

In the present embodiment, the CPU 18 converts the position information, i.e., the coordinates (x, y, z) of the position A in the form of the three-dimensional rectangular coordinates system expression into a generally used expression, i.e., the latitude, longitude, and altitude values, and then displayed on the internal display 11 which is observable in the field of view of the binocular 100 and the external display unit 12.

The position information is automatically and alternately displayed in accordance with calculation of the present position and/or the signals received from the external device (the other binocular). During data communication with the other binocular 200, only the present position obtained by calculation and time and date are displayed repeatedly and alternately.

The display method is not limited to the above-mentioned one, but it may be modified such that display and non-display conditions are alternated upon operation of display ON/OFF switch. Alternatively, the above modification may further be modified such that the present position of the binocular 100, the present position of the other binocular 200, the distance and azimuth angle of the binocular 200 relative to the binocular 100, and the present time are alternately displayed upon operation of the display switch. Examples of such display (e.g., a displayed image) are described later.

The position information obtained as described above is transmitted as follows. As mentioned above, the binocular 100 located at the position A is assumed to operate in the communication mode. In the communication mode, the CPU 18 controls the connection changeover switch 19 to connect the rod antenna 17 with the signal receiving unit 10 as an initial state. That is, when the binocular 100 operates in the communication mode, the binocular 100 is ready to receive data. The other binocular 200 has the same function, in terms of position determining and communicating function, as the binocular 100.

In this condition, the user 16 of the binocular 200 operates the transmission switch of the operations switches of the binocular 200. When an operation switches is operated, the CPU 18 of the binocular 200 switches the connection changeover switch 19 to connect the rod antenna 17 with the data transmitting unit 9. With this, the CPU 18 in the binocular 200 transmits by radio frequency or signals the position data (e.g., coordinates x, y, z) of the three-dimensional rectangular coordinates system of the position of the binocular 200 and the time which is obtained by the GPS signal receiving unit 8 when the data was obtained by the GPS signal receiving unit 9, to the binocular 100 at the position A via the rod antenna 17. Immediately after the transmission, the CPU 18 switches the connection changeover switch 19 to connect the rod antenna 17 with the data receiving unit 10. That is, except when data is being transmitted, the connection changeover switch 19 always remains ready to receive the signal transmitted from the external device.

In the binocular 100, the data receiving unit 10 receives the signal transmitted from the binocular 200 via the rod antenna 17 and stores the data in the built-in memory of the receiving unit 10.

In the binocular 100, similar to the above, by operating the transmission switch, the position data (x, y and z coordinates) of the binocular 100 and the corresponding time can be transmitted to the binocular 200. It should be noted that, in this case, the transmission switch is operated to transmit data. However, the embodiment can be modified such that, for example, the data (i.e., the signal) is transmitted to the other binocular automatically upon receipt of data. That is, in this modification, when the binocular 100 has received position data from the binocular 200, the CPU 18 of the binocular 100 automatically start transmitting the position data of the binocular 100 to the binocular 200.

Based on both the position data (i.e., x, y and z coordinates data) and time data of the binocular 200 stored in the built-in memory of the receiving unit 10, and the coordinates data and time data of the binocular 100 stored in the memory 18M of the CPU 18, the CPU 18 calculates a difference of coordinates between the positions A and B at the same point of time, then determines the distance and an altitude difference therebetween, the azimuth angle of the binocular 200 viewed from the binocular 100, and then stores the obtained values together with the time data in the display data memory 20. Further, the CPU 18 of the binocular 100 converts the coordinates data of the binocular 100 and that of the binocular 200 into the values of latitude, longitude, and altitude, and stores the converted values also in the display data memory 20. Note that the azimuth angle refers to an angle measured in the clockwise direction relative to the true North (i.e., in a direction from North, East, South, West, and back to North).

Thus, when the operations for the display data have been completed and the calculated data are stored in the display data memory 20, a message or symbol which indicates the completion of data reception is displayed on the internal display unit 11 and on the external display unit 12. Alternatively, instead of the message or symbol, the calculated values, for example, the present position of the points A and B, the distance and altitude difference therebetween, the azimuth angle, and/or the time may be displayed. Still alternately or optionally, a beep sound or other sound effects, or combination of the sound effects and display may be used to indicate the completion of data transmission.

The user of the binocular 100 can switch the displayed information displayed on the internal display unit 11 and the external display unit 12. For example, upon every operation of the display switch, (1) a condition in which latitude, longitude, altitude of a position of the user 15 (i.e., the user of the binocular 100) are displayed, (2) a condition in which latitude, longitude, altitude of a position of the user 16 (i.e., the user of the binocular 200) are displayed, (3) a condition in which a distance and altitude difference between the points A and B and the azimuth angle are displayed, (4) a condition in which time is displayed, and (5) no display condition may be alternately selected.

The display of information on the internal display unit 11 and the external display unit 12 (i.e., the display of altitude, longitude, and altitude of a position of the user 15, the display of the same of the user 16 and a distance and altitude difference between the user 15 and the user 16, the azimuth angle, and the display of date and time) will be presented in the following manner. It should be noted that the followings are only examples, and the indicated values do not have any particular meanings.

Display of the user's position
    Latitude: 35° 40' 40" N
    Longitude: 139° 40' 38" E
    Altitude: 350 m
Display of the other user's position
    Latitude: 35° 40' 52" N
    Longitude: 139° 40' 50" E
    Altitude: 400 m
Display of distance, altitude difference, and azimuth angle of the other user's position
    Distance; 510 m
    Altitude difference: 50 m
    Azimuth angle: 45° 02' 10"
Display of date and time
    96/12/20
    10:28 a.m.

The external display unit 12 may have a sufficiently wide display area and can simultaneously display the values of latitude, longitude, and altitude. However, the internal display unit 11 does not have a sufficient display area since the information is to be overlapped with the image of the object. Accordingly, it is preferable the internal display unit 11 present simplified indication of various values using abbreviations or the like. It is further preferable that the each data would be displayed alternately as being scrolled within a limited display area. In this case, the data may be scrolled upon operation of display button of the operation unit 13, or automatically done without any particular operation by the user.

Basically, at least the position of the user, and the distance, altitude difference, and azimuth angle of the other user are displayed, the other information may be omitted.

When a direction of the binocular 200 relative to the binocular 100, i.e. distance, altitude difference, and azimuth angle of the binocular 200 relative to the binocular 100, are specified as described above, the user of the binocular 100 can find the binocular 200 easily by directing the binocular 100 referring to a compass.

Although in the above description, display on the binocular 100 side is described, the same data can be displayed on the binocular 200 side with the similar operation.

In the above-described embodiment, both the users 15 and 16 use the similar binoculars 100 and 200. However, as far as the user 15 has the binocular 100 having the above-described structure, the user 16 need not have a binocular 200, but only needs to have a device which is capable of transmitting position data to the binocular 100 so that the binocular 100 may receive position data from the external device to calculate the position of the device relative to the binocular 100.

The binocular described above receives the GPS signal from the GPS satellites to obtain the position and time of its own position. Further, the binocular receives position information of an external device of a similar binocular located at another position, to obtain values of distance, altitude difference, and azimuth angle, and displays those values on the display unit provided in the binocular. Therefore, a binocular according to the present embodiment has a function superior to the conventional ones in a respect that even if the position of the other user is not known, it is possible to accurately identify its own position, and the position and the distance, altitude difference, and azimuth angle of the other binocular with respect to the present position.

It should be noted that the position information to be displayed include the latitude, longitude, and altitude in the above-described embodiment. However, this can be modified such that, for example, the three-dimensional orthogonal coordinates values may be displayed.

In the embodiment, the GPS signal receiving unit 8 obtains the position information as the three-dimensional rectangular coordinates values. However, the GPS signal receiving unit 8 may be modified to obtain the values of latitude, longitude, and altitude. Further, the transmitted information may also be the values of latitude, longitude, and altitude. Furthermore, although the relative position between two points are expressed as values of distance, altitude difference, and azimuth angle in the embodiment, the relative position may also be expressed and displayed as an elevation angle (or depression angle) and the azimuth angle calculated on the basis of the distance and the altitude difference.

In the above-mentioned example, there is described a case where the user 15 of the binocular 100 who does not know the position of the other user 16 of the binocular 200 specifies the position of the binocular 200 by data communication, in order to bring the binocular 200 (or, the user 16) in the field of view of the binocular 100. The present embodiment, however, can also be used to know the accurate positions, distance, or the like of the two positions through data communication while the users 15 and 16 recognize the positions with each other. In such a case, since various kinds of information can be displayed on the internal display unit 11, with being overlapped on the image of the object, in the field of view of each binocular, the user can read out those information with viewing the other user.

In the above-described embodiment, the position data is transmitted/received by manually operating the operation unit 13 provided on the external surface of the main body 5. The embodiment can be modified such that the data is according to a certain communication protocol.

Figure 4:
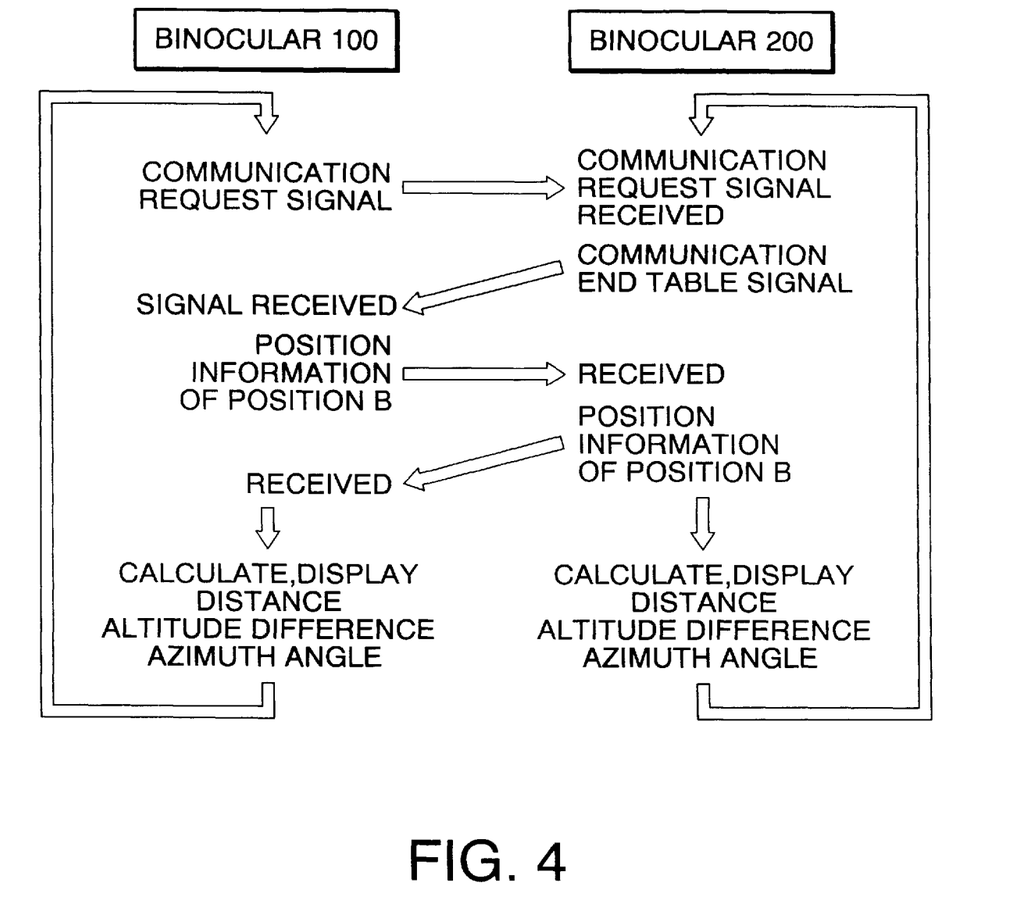
FIG. 4 shows a communication protocol for transmitting and receiving positioning information.

FIG. 4 shows an example of protocol for automatic transmission and reception of the position data. When communication as shown in FIG. 4 is conducted, both binoculars 100 and 200 operate in the communication mode.

Data communication according to the protocol shown in FIG. 4 is initiated by operating a communication request switch. First, the binocular 100 transmits a signal to the binocular 200 which requests the binocular 200 for data communication, upon operation of the communication request switch. Specifically, when the communication request switch is operated, the CPU 18 switches the connection changeover switch 19 to connects the rod antenna 17 with the data transmission unit 9 to transmit a communication request signal. When the binocular 200 receives the communication request signal from the binocular 100, the binocular 200 transmits a communication enable signal to the binocular 100 to notify that communication is established, if data communication is possible, i.e., if the binocular 200 is ready to transmit the position data. When the binocular 100 receives the communication enable signal from the binocular 200, the binocular 100 transmits the position data of the position A to the binocular 200. When the binocular 200 receives the position data from the binocular 100, the binocular 200 transmits the data of the position of the binocular 200, i.e., data of the position B, to the binocular 100. When the binocular 100 receives the position data from the binocular 200, the binocular 100 obtains, by calculation, the values of distance, altitude difference, and azimuth angle between the two positions, and stores the calculated values in the display memory 20, and displays them on the internal display unit 11 and the external display unit 12.

The binocular 200 carries out almost the similar processing. The above-mentioned data communication and the calculation of distance, altitude difference, and azimuth angle will be repeated until the operation switches of the binoculars 100 and 200 are operated to terminate the processing.

In FIG. 4, the binocular 100 transmits the communication request. If the communication request switch of the binocular 200 is operated, the similar processing is initiated by the communication request from the binocular 200 to the binocular 100. Alternatively or optionally, it can be modified such that, instead of operating the communication request switch, the communication protocol shown in FIG. 4 starts at every predetermined time interval.

In the embodiment, with reference to the time information stored in the memory 18M, the distance, altitude difference, and azimuth angle between positions A and B are determined based on the position information of both the binoculars 100 and 200 exactly at the same point of time. However, the data stored in the memory 18M is the data obtained within approximately the same point of time, or within a very short period of time, and therefore if the users 15 and 16 travel slowly, values of the distance, altitude difference, and azimuth angle obtained based on the data values which does not obtained exactly at the same point of time, the calculated values can be considered sufficiently accurate. With this respect, it may be possible modify the embodiment such that the position information transmitted between the binoculars 100 and 200 does not include the time information.

Figure 5:
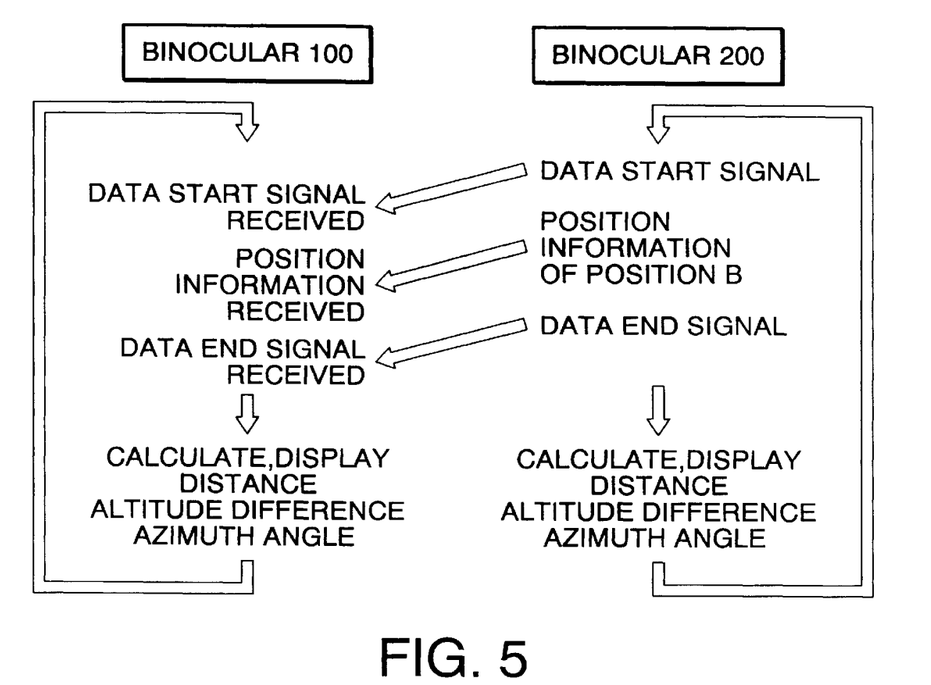
FIG. 5 shows a communication protocol according to a second embodiment.

FIG. 5 shows another example of protocol according to a second embodiment of the invention. According to the communication processing of FIG. 4, the binoculars 100 and 200 exchange position information with each other. In the communication processing shown in FIG. 5, only the binocular 200 transmits position information to the binocular 100, while the binocular 100 only receives the information. In this example, a data transmission switch may be provided instead of the communication request switch provided in the binocular according to the first embodiment. During the processing of FIG. 5, both the binoculars 100 and 200 operate in the communication mode.

When the data transmission switch of the binocular 200 is operated, the CPU 18 of the binocular 200 switches the connection changeover switch 19 to connect the rod antenna 17 with the data transmission unit 9. Then, the binocular 200 sequentially transmits an initiation signal indicative of the data start signal, position information of the spot B, which are obtained using the GPS, and a data end signal indicative of the end of the data.

The binocular 100, when having received the data start signal from the binocular 200, obtains the position information of the binocular 200 and processes the received data until the data end signal is received. That is, based on both the position information transmitted from the binocular 200 and that of the binocular 100, the binocular 100 calculates a position of the binocular 200 relative to the binocular 100 (i.e., position B relative to the position A) and displays the calculation results. In this case, in the binocular 100, the position information of the position A of the binocular 100 is displayed when a signal from the binocular 200 is being received. Alternatively, it is modified such that no display is occurred when the signal is being received from the binocular 200.

Figure 6:
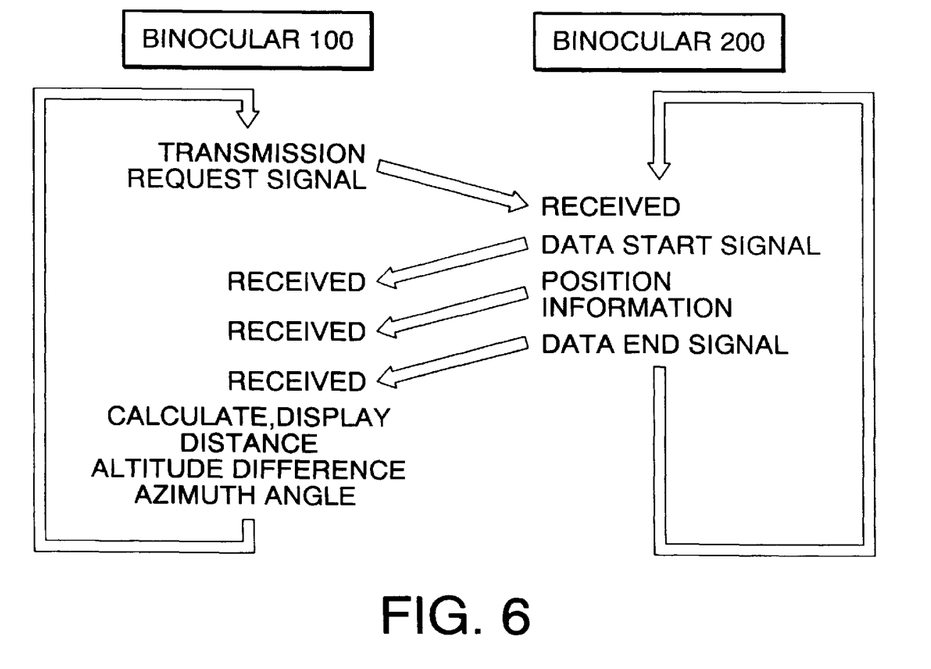
FIG. 6 shows a communication protocol according to a third embodiment.

FIG. 6 shows an example of communication processing according to a third embodiment of the present invention wherein a binocular 200 transmits position information of the position B to the binocular 100 in response to a data-transmission request received from the binocular 100. In the third embodiment, a transmission request switch requesting data transmission is provided instead of the communication request switch employed in the first embodiment. In the third embodiment, both the binoculars 100 and 200 operate in the communication mode.

When the transmission request switch of the binocular 100 is operated during the processing shown in FIG. 6, the CPU 18 of the binocular 100 switches the connection changeover switch 19 to connect the rod antenna 17 with the data transmission unit 9 to transmit a transmission request signal to the binocular 200 to ask for transmitting the position information of the position B. The CPU 18 of the binocular 100, upon transmission of the transmission request signal, switches the connection changeover switch 19 to connect the rod antenna 19 with the data reception unit 10, and waits for data transmission of the binocular 200.

Upon reception of the transmission request signal from the binocular 100, the binocular 200 first transmits a data start signal indicative of the starting of transmitting the position information, then the position information of the position B. Then, the binocular 200 transmits a termination signal indicative of the termination of transmitting the position information. In the binocular 100, when the data start signal is received after transmitting the transmission request signal, receives the position information until the termination signal is transmitted from the binocular 200, and displays the position of the binocular 200 relative to the binocular 100 based on both the received position information (of the position B) and the position information (of the position A) obtained through signals sent from the GPS satellites.

As described above, according to the embodiments, a telescope utilizing the GPS is provided with the position determining system to receive signals from the GPS satellites, and obtains the accurate position of the telescope itself. Moreover, the telescope is provided with a communication system with which the position information is transmitted and/or received to/from another external device. Thus, based on position information values, the relative position of the external device relative to the telescope can be obtained, and indicated to the user of the telescope. The indication is a visual indication using a vision of the user. The relative position is given, for example, in distance, altitude difference, and azimuth angle, thereby enabling the user to specify the position of the external device with respect to the telescope easily.

That is, even if the position of the external device is not known, it is possible to direct the telescope toward the external device as the position is indicated based on the relative position of the external device with respect to the telescope. Further, when the external device or its user is caught in the view field of the telescope, it is possible to accurately know the position, e.g., the distance, altitude difference of the external device.

The present disclosure relates to subject matter contained in Japanese Patent Application No. HEI 09-19933, filed on Jan. 17, 1997, which is expressly incorporated herein by reference in its entirety.

What is claimed is:

1. A telescope having a main body, said telescope expanding a visual angle of a remote object and allowing observation of an object image in a field of view of said telescope, said main body comprising:
   a position determining system which receives a position signal from GPS (global positioning system) satellites to calculate a present position of said telescope;
   a communication system which communicates with an external device which is capable of transmitting information regarding a position of said external device;
   a relative position determining system which determines a relative position of said external device with respect to said telescope based on said present position obtained by said position determining system and position information received from said external device; and
   an indication system which indicates information regarding said relative position of said external device relative to said telescope.

2. The telescope according to claim 1, wherein said relative position determining system obtains, by calculation, a distance, an altitude difference, and an azimuth angle between said telescope and said external device.

3. The telescope according to claim 1, wherein said relative position determining system obtains said relative position based on said present position and said position information which have been obtained at the same point of time.

4. The telescope according to claim 1, wherein said indication system comprises a displaying device which indicates said relative position to a user of said telescope within a view of said user.

5. The telescope according to claim 4, wherein said displaying device displays said relative position in an observation field of view of said telescope.

6. The telescope according to claim 1, wherein said telescope is a binocular.

7. The telescope according to claim 1, wherein said telescope comprises date transmission system for transmitting said present position obtained by said position determining system, to said external device.

8. The telescope according to claim 1, wherein said indication system indicates said present position obtained by said position determining system, in addition to said relative position between said telescope and said external device.

9. The telescope according to claim 8, wherein said indication system comprises a display device which indicates said present position to a user within a view of said user.

10. The telescope according to claim 9, wherein said display device displays said present position in an observation view field of said telescope.

11. The telescope according to claim 1, wherein said indication system further indicates position information of said external device received from said external device.

12. A telescope that provides an enlarged image of a remote object and allows observation of an object image in a field of view of the telescope, the telescope including a main body, said main body comprising:
   a first position determining system which receives a position signal from global positioning system satellites to calculate a present position of said telescope;
   a communication system which communicates with an external device, said external device being capable of transmitting information regarding a position of said external device to said telescope;
   a second position determining system which determines the position of said external device in accordance with information transmitted from said external device; and
   an indication system which indicates information regarding the position of said external device.

13. The telescope according to claim 12, said indication system comprising a display device which indicates said position of the external device to a user of said telescope within a view of said user.

14. The telescope according to claim 13, said displaying device displaying said position of the external device in an observation field of view of said telescope.

15. The telescope according to claim 12, wherein said telescope comprises a binocular.

16. The telescope according to claim 12, further comprising a data transmission system that transmits position data obtained by said first position determining system to said external device.

17. The telescope according to claim 12, said indication system indicating a present position of said telescope.

18. The telescope according to claim 12, said indication system indicating position information of said external device received from said external device.

19. The telescope according to claim 12, said external device having a communication system capable of transmitting information regarding a position of said external device to said second position determining system of said telescope via said communication system of said main body.

20. A telescope that provides an enlarged image of a remote object and allows observation of an object image in a field of view of the telescope, the telescope including a main body, said main body comprising:
   a first position determining system which receives a position signal from global positioning system satellites to calculate a present position of said telescope;
   a communication system which communicates with an external device, said external device being capable of transmitting information regarding a position of said external device to said telescope;
   a second position determining system which determines the position of said external device; and
   an indication system which indicates information regarding the position of said external device received from said external device.

* * * * *